(12) United States Patent
Yaghmai et al.

(10) Patent No.: US 11,641,328 B1
(45) Date of Patent: May 2, 2023

(54) SYSTEMS AND METHODS FOR FACILITATING TOPIC-BASED MESSAGING SESSIONS

(71) Applicant: Meta Platforms, Inc., Menlo Park, CA (US)

(72) Inventors: Mike M. Yaghmai, Los Gatos, CA (US); Alireza Bitaraf Haghighi, East Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 35 days.

(21) Appl. No.: 17/483,640

(22) Filed: Sep. 23, 2021

Related U.S. Application Data

(63) Continuation of application No. 15/660,522, filed on Jul. 26, 2017, now Pat. No. 11,140,100.

(51) Int. Cl.
| | | |
|---|---|---|
| *H04L 51/04* | (2022.01) | |
| *H04L 51/52* | (2022.01) | |
| *G06F 16/9535* | (2019.01) | |
| *G06F 16/2457* | (2019.01) | |

(52) U.S. Cl.
CPC ........ *H04L 51/04* (2013.01); *G06F 16/24578* (2019.01); *G06F 16/9535* (2019.01); *H04L 51/52* (2022.05)

(58) Field of Classification Search
None
See application file for complete search history.

(56) References Cited

U.S. PATENT DOCUMENTS

| | | | |
|---|---|---|---|
| 8,539,359 | B2 | 9/2013 | Rapaport et al. |
| 8,843,835 | B1 * | 9/2014 | Busey ................. H04L 63/0421 715/854 |
| 9,715,532 | B1 * | 7/2017 | Hall .................... G06F 16/9535 |
| 10,007,936 | B1 | 6/2018 | Ghoshal et al. |
| 2007/0260724 | A1 | 11/2007 | Rowley |
| 2017/0228803 | A1 | 8/2017 | Dollard |
| 2018/0285986 | A1 | 10/2018 | Perry et al. |

* cited by examiner

*Primary Examiner* — Angela Nguyen
(74) *Attorney, Agent, or Firm* — Sheppard Mullin Richter & Hampton LLP

(57) ABSTRACT

Systems, methods, and non-transitory computer-readable media can receive an indication that a first user is interested in participating in a topic-based messaging session pertaining to a first topic. A second user to match with the first user is identified based on user matching criteria. A topic-based messaging session within which the first user and the second user can exchange messages is generated.

20 Claims, 9 Drawing Sheets

350

352

How would you describe your views?

| 354 | very conservative | conservative | neutral | liberal | very liberal |
|---|---|---|---|---|---|
| SOCIAL | | | | | |
| FISCAL | | | | | |
| POLITICAL | | | | | |
| RELIGION | | | | | |

Tell us a little more about yourself:                                356

Location:                    Age:
Marital Status:              Education:
Children:                    Occupation:
Hobbies:

358

Write a brief introduction of yourself. Remember that the best dialogues are those that are friendly, factual, and non-confrontational.

- Mike, a married father of 2, a teacher from California who likes soccer, cooking, and reading, has been added. Here is a hello from him: Hello! I'm Mike and I consider myself a social conservative.
- Joe from Nevada has been added. Joe is a single father with one daughter, is a chef, and enjoys hiking and snakes. Here is a hello from him: Hi, I'm Joe, and I am socially liberal.

You can start now. Remember that the best dialogues are those that are friendly, respectful, and factual. Have fun!

Mike: Hi Joe, it's great to meet you.

Joe: Hi, Mike. Great to meet you as well. How do you feel about these protests in the mountains?

Mike: I can see the perspective of the mountain residents. However, I have to say that I disagree with the protests. I don't find much merit in their positions.

Joe: What do you disagree with?

Rate your conversation, with 1 being the worst score and 5 being the best

|  | 1 | 2 | 3 | 4 | 5 |
|---|---|---|---|---|---|
| FRIENDLY |  |  |  |  |  |
| FACTUAL |  |  |  |  |  |
| RESPECTFUL |  |  |  |  |  |

Let us know what you liked and disliked about this conversation

FIGURE 4

SYSTEMS AND METHODS FOR FACILITATING TOPIC-BASED MESSAGING SESSIONS

CROSS-REFERENCE TO RELATED APPLICATIONS

This application is a continuation of U.S. patent application Ser. No. 15/660,522, filed on Jul. 26, 2017 and entitled "SYSTEMS AND METHODS FOR FACILITATING TOPIC-BASED MESSAGING SESSIONS", which is incorporated herein by reference in its entirety.

FIELD OF THE INVENTION

The present technology relates to the field of messaging systems. More particularly, the present technology relates to systems and methods for facilitating topic-based messaging sessions.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. Users can also use the social networking system to exchange communications or messages with other users.

SUMMARY

Various embodiments of the present disclosure can include systems, methods, and non-transitory computer readable media configured to receive an indication that a first user is interested in participating in a topic-based messaging session pertaining to a first topic. A second user to be matched with the first user is identified based on user matching criteria. A topic-based messaging session is generated within which the first user and the second user can exchange messages.

In an embodiment, the user matching criteria comprises a determination that the second user has also indicated an interest in participating in a topic-based messaging session pertaining to the first topic.

In an embodiment, the user matching criteria comprises a determination that the second user has at least one differing viewpoint from the first user.

In an embodiment, the user matching criteria comprises a determination that the second user has a differing viewpoint from the first user with respect to the first topic.

In an embodiment, user rating information for the second user is received from the first user based on the topic-based messaging session.

In an embodiment, the identifying the second user to be matched with the first user based on the user matching criteria comprises: identifying a set of potential matches for the first user based on the user matching criteria; and selecting the second user from the set of potential matches based on the user matching criteria.

In an embodiment, the selecting the second user from the set of potential matches comprises ranking the set of potential matches based on user ranking criteria.

In an embodiment, the user ranking criteria comprises user rating information.

In an embodiment, the second user is selected from the set of potential matches based on the ranking.

In an embodiment, a subset of the set of potential matches is presented to the first user based on the ranking. A selection by the first user is received selecting the second user from the subset of the potential matches.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 3B illustrates an example scenario associated with collecting user information for a topic-based messaging session, according to an embodiment of the present disclosure.

FIG. 3C illustrates an example scenario associated with generating and/or managing a topic-based messaging session, according to an embodiment of the present disclosure.

FIG. 4 illustrates an example scenario associated with receiving and/or providing user ratings based on a topic-based messaging session, according to an embodiment of the present disclosure.

Figure 1:
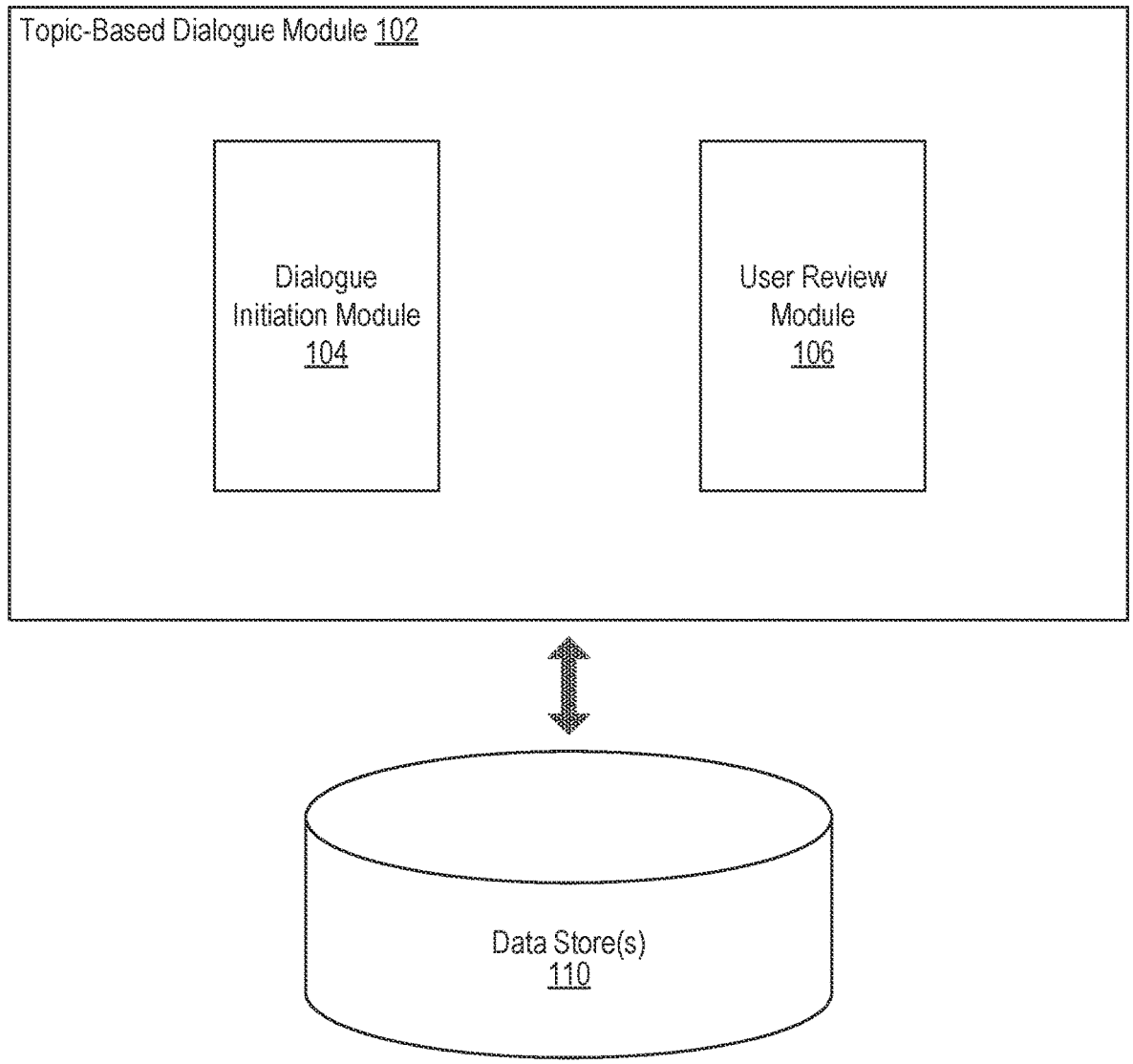
FIG. 1 illustrates an example system including a topic-based dialogue module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Facilitation of Topic-Based User Dialogues

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. Users can also use the social networking system to communicate with and/or exchange messages with other users.

Users of a social networking system may post content about various topics. For example, users may share content posts about current events or other trending topics. Users of a social networking system may have different backgrounds, different personal experiences, or different belief systems and accordingly may have differing opinions about various topics. However, under conventional approaches, users of a social networking system may primarily be exposed to other users that are similar to them, and may not have significant opportunities to engage with other users that have differing views. Furthermore, even when users are exposed to other users with differing views, it can be a challenge to provide users with tools or forums to engage in thoughtful or meaningful discourse. This is particularly true when users attempt to discuss nuanced issues using communications media that are not designed to promote robust, back-and-forth dialogue (e.g., interacting in a public comments section to a content post). As such, conventional approaches may experience difficulty in promoting meaningful discourse about nuanced issues between users with differing viewpoints. Accordingly, conventional approaches may not be effective in addressing these and other problems arising in computer technology.

An improved approach rooted in computer technology overcomes the foregoing and other disadvantages associated with conventional approaches specifically arising in the realm of computer technology. In general, a user can be provided with the ability to request a messaging session pertaining to a particular topic, i.e., a topic-based messaging session. For example, if a user sees a content post about a particular topic posted to a social networking system, the user can indicate (e.g., via a user interface) that the user would be interested in participating in a topic-based messaging session about the particular topic. The user can be matched with another user that has also indicated an interested in participating in a topic-based messaging session about the particular topic. In certain embodiments, users that have differing viewpoints, at least in some respects, can be matched with one another. In certain embodiments, when a user indicates an interest in participating in a topic-based messaging session about a particular topic, the user may be asked to fill out a questionnaire regarding the user's views on certain issues, such as politics, fiscal policies, social policies, religion, and/or the particular topic. Based on the questionnaire, the user can be matched with another user that has also indicated an interest in discussing the particular topic, and has one or more views that differ from the user. A messaging session (such as an instant messaging session) can be generated which includes the two users. The two users can exchange messages within the messaging session and engage in dialogue about the particular topic. In this way, users that are interested in engaging in meaningful dialogue with other users that have differing views can be provided with an opportunity and appropriate forum to do so. In various embodiments, users can be given the ability to rate their conversations with other users. User ratings associated with a user can be used as an indicator of the user's quality as a discussion partner, e.g., how courteous and/or respectful the user is, or how knowledgeable the user is about a particular topic. Users with positive ratings can be upranked and given preference for opportunities to engage with other users, while users with negative ratings can be downranked and potentially blocked from engaging with other users in topic-based messaging sessions. Additional details about the disclosed technologies will be provided herein.

FIG. 1 illustrates an example system 100 including an example topic-based dialogue module 102, according to an embodiment of the present disclosure. The topic-based dialogue module 102 can be configured to generate and facilitate topic-based messaging sessions between users. In various embodiments, the topic-based dialogue module 102 can be configured to receive an indication from a first user that the first user is interested in participating in a topic-based messaging session pertaining to a particular topic. The topic-based dialogue module 102 can receive a first set of user information associated with the first user. For example, the first set of user information can include information collected from the first user via a questionnaire provided to the first user. The topic-based dialogue module 102 can match the first user with a second user based on user matching criteria. User matching criteria can include, for example, a determination that both the first user and second user have indicated an interest in participating in a topic-based messaging session about the same topic. In another example, the user matching criteria can include user information associated with the first and second users (e.g., the first set of user information associated with the first user and a second set of user information associated with the second user). In certain embodiments, the first and second sets of user information may indicate that the first user and the second user have differing viewpoints in at least some respects. The topic-based dialogue module 102 may match the first user and the second user based on a determination that the first and second users have differing viewpoints. For example, the first user may have indicated that he or she is politically conservative, while the second user has indicated that he or she is politically liberal. Or in another example, the first user may have indicated that he or she disagrees with a particular position, while the second user has indicated that he or she agrees with the particular position. The topic-based dialogue module 102 can generate and manage a topic-based messaging session that includes the first user and the second user. The first and second users can exchange messages within the topic-based messaging session.

In certain embodiments, the first user and the second user may be given the ability to review and/or rate one another. For example, a user that has participated in a topic-based messaging session can be provided with a user review survey which asks the user to rate the other user in a topic-based messaging session on various criteria, such as friendliness, respectfulness, how knowledgeable the user was (i.e., knowledgeableness), and/or how factual the user was (i.e., factualness). User reviews and/or ratings may be used as user matching criteria for subsequent topic-based messaging sessions. For example, when a user indicates an interest in participating in a topic-based messaging session about a particular topic, a set of potential matches can be identified and ranked such that potential matches that have higher user ratings are upranked, while potential matches with lower ratings are downranked.

As shown in the example of FIG. 1, the topic-based dialogue module 102 can include a dialogue initiation module 104 and a user review module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the topic-based dialogue module 102 can be implemented in any suitable combinations.

In some embodiments, the topic-based dialogue module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the topic-based dialogue module 102 can be implemented, in part or in whole, as software running on one or more computing devices or systems, such as on a user or client computing device. For example, the topic-based dialogue module 102, or at least a portion thereof, can be implemented as or within an application (e.g., app), a program, or an applet, etc., running on a user computing device or a client computing system, such as the user device 610 of FIG. 6. In another example, the topic-based dialogue module 102, or at least a portion thereof, can be implemented using one or more computing devices or systems that include one or more servers, such as network servers or cloud servers. In some instances, the topic-based dialogue module 102 can, in part or in whole, be implemented within or configured to operate in conjunction with a social networking system (or service), such as the social networking system 630 of FIG. 6. It should be understood that there can be many variations or other possibilities.

The topic-based dialogue module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the topic-based dialogue module 102. For example, the data store 110 can store one or more topic-based dialogue user databases, user information, user matching criteria, user ranking criteria, user reviews and/or ratings, messaging session information, and the like. It is contemplated that there can be many variations or other possibilities.

The dialogue initiation module 104 can be configured to initiate a topic-based messaging session between two or more users. The dialogue initiation module 104 can be configured to receive an indication that a first user is interested in participating in a topic-based messaging session pertaining to a particular topic. The dialogue initiation module 104 can identify one or more potential matches that have also expressed an interest in participating in a topic-based messaging session pertaining to the particular topic. The dialogue initiation module 104 can match the first user with a second user from the one or more potential matches based on user matching criteria. The dialogue initiation module 104 can then generate a topic-based messaging session between the first user and the second user. The first user and the second user can exchange messages within the topic-based messaging session. Although various example embodiments discussed herein will describe topic-based messaging sessions which include two users, it should be understood that a topic-based messaging session can include two or more users, and the various features described herein can also be applied to topic-based messaging sessions have more than two users. The dialogue initiation module 104 is described in greater detail herein with reference to FIG. 2.

The user review module 106 can be configured to collect and maintain user reviews and/or ratings based on topic-based messaging sessions. For example, if a first user and a second user are participating in or have participated in a topic-based messaging session with one another, the first user can be given the opportunity to review the second user, and the second user can be given the opportunity to review the first user. The user review module 106 can present a user review survey via a user interface. The user review survey may ask a first user to review a second user based on the second user's statements and behavior in a topic-based messaging session. The user review survey may ask for reviews and/or ratings in various categories, such as friendliness, respectfulness, knowledgeableness, factualness, etc. For example, the user review survey may ask a first user to score a second user on a scale from 1 to 5 in the various categories. The user review module 106 can maintain, for each user, individual category ratings, as well as an overall user rating. In certain embodiments, the overall user rating may be calculated based on the individual category ratings (e.g., as an average of the individual category ratings).

In certain embodiments, the user review module 106 can be configured to present a user with a user review survey when a review triggering event is detected. For example, the review triggering event may be an indication that a user has terminated a topic-based messaging session. Termination of a topic-based messaging session may be determined based on, for example, a user closing or leaving a topic-based messaging session. In another example, termination of a topic-based messaging session may be determined based on natural language analysis of messages exchanged within the topic-based messaging session. For example, termination of a topic-based messaging session can be determined based on a user sending a message indicative of termination of a topic-based messaging session, such as "Goodbye" or "Great chatting with you." In certain embodiments, the review triggering event may occur based on a threshold number of messages having been exchanged in a topic-based messaging session. For example, users in a topic-based messaging session may be presented with user review surveys after 25 or another suitable number of messages have been exchanged within the topic-based messaging session.

In certain embodiments, user ratings associated with a user may be associated with a particular topic. For example, a user may be very knowledgeable about soccer, but not as knowledgeable about politics. As such, the user may have multiple knowledgeableness ratings, i.e., a first knowledgeableness rating associated with a first topic (e.g., soccer) and a second knowledgeableness rating associated with a second topic (e.g., politics). It should be appreciated that the concept of having multiple ratings based on different topics can be applied to any other rating, e.g., overall user rating, friendliness rating, respectfulness rating, factualness rating, etc.

In various embodiments, user reviews can be used as user matching criteria for matching users for topic-based messaging sessions, as will be described in greater detail herein with reference to FIG. 2. For example, users that have high ratings may be given preference (e.g., upranked) over users that have lower ratings. In certain embodiments, users with low ratings may face negative consequences. For example, users with ratings below a threshold rating may be blocked from participating in topic-based messaging sessions.

In certain embodiments, users may be provided with designations and/or certifications based on user ratings. For example, a user that is consistently highly rated (e.g., satisfies a user rating threshold and has been reviewed greater than a threshold number of times) can be identified and designated as a trusted user. The trusted user designation can be visually indicated within a social networking system so that other users can see that the user has been designated as a trusted user. For example, when the user posts a comment on a public content post within a social networking system, the user's comment can be visually marked with a badge or other visual indicator indicating that the user is a trusted user.

Figure 2:
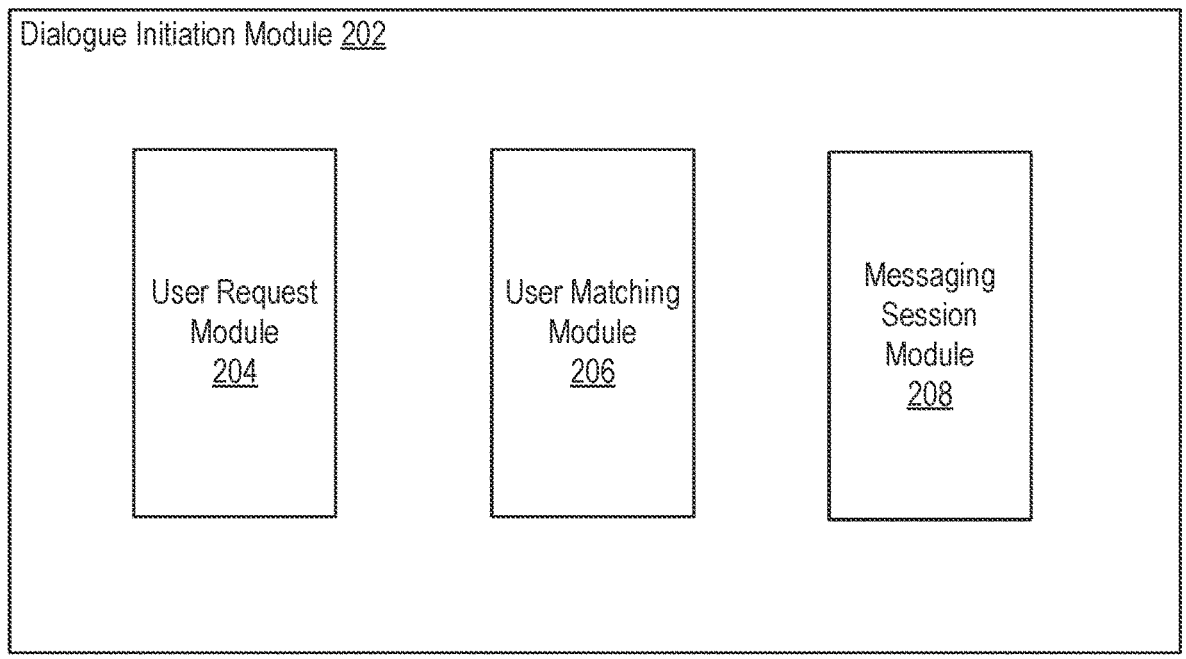
FIG. 2 illustrates an example dialogue initiation module, according to an embodiment of the present disclosure.

FIG. 2 illustrates an example dialogue initiation module 202 configured to initiate and manage a topic-based messaging session between two or more users, according to an embodiment of the present disclosure. In some embodiments, the dialogue initiation module 104 of FIG. 1 can be implemented as the dialogue initiation module 202. As shown in the example of FIG. 2, the dialogue initiation module 202 can include a user request module 204, a user matching module 206, and a messaging session module 208.

The user request module 204 can be configured to receive an indication that a user is interested in participating in a topic-based messaging session pertaining to a particular topic. In certain embodiments, a user viewing a content post on a social networking system can be provided with a user interface object via which the user can indicate that the user would like to participate in a topic-based messaging session pertaining to a topic associated with the content post. For example, if a content post pertains to a legal decision rendered by the Supreme Court, the user can select a user interface object (e.g., a button or a link) indicating that the user would like to participate in a topic-based messaging session pertaining to the Supreme Court's decision. When a user indicates that he or should would like to participate in a topic-based messaging session pertaining to a particular topic, the user request module 204 can add the user to a user database and associate the user with the particular topic. The user database can keep a record of users that are interested in participating in topic-based messaging sessions, and each user can be associated with one or more topics in which the user has expressed an interest.

In certain scenarios, a content post may be associated with multiple topics. Consider an example of a content post that reads: "Restaurant A has the best burgers ever, but it's too bad that they support legislation XYZ!" This content post may be associated any of the following topics: Restaurant A, Restaurant A's burgers, the best burgers, legislation XYZ, Restaurant A's support of legislation XYZ, etc. In various embodiments, the user request module 204 can be configured to automatically select a particular topic from a plurality of topics associated with a content post. For example, in certain embodiments, the user request module 204 can select one topic from a plurality of topics associated with a content post based on a navigation path taken by a user to access the content post. For example, if the user came upon the example content post via a page that opposes legislation XYZ, then it is likely that the user is interested in discussing legislation XYZ. However, if the user came upon the content post via a page devoted to burgers, the user may be interested in discussing Restaurant A's burgers.

The user matching module 206 can be configured to match users for a topic-based messaging session based on user matching criteria. User matching criteria can include, for example, a determination that two users have both indicated an interest in participating in a topic-based messaging session pertaining to the same particular topic. In various embodiments, user matching criteria can also include user viewpoint criteria. For example, two users can be matched based on a determination that the two users have at least one differing viewpoint. For example, users that have identified themselves as politically liberal may be matched with users that have identified themselves as politically conservative. Or users that have identified themselves as neutral religiously may be matched with users that have identified themselves as religiously liberal or religiously conservative. In a more particular embodiment, two users can be matched for a topic-based messaging session pertaining to a particular topic based on a determination that the two users have differing viewpoints with respect to the particular topic.

In certain embodiments, the user matching module 206 can provide users with a survey or questionnaire in order to obtain user information, such as user viewpoint information. The questionnaire can collect user viewpoint information by asking for the user's positions on various issues. For example, the questionnaire may ask the user to identify himself or herself as very liberal, liberal, neutral, conservative, or very conservative in various categories, e.g., political, fiscal, social, religion, etc. The questionnaire may also ask for other user information in addition to user viewpoint information. For example, the questionnaire may ask for a user's location, age, marital status, educational background, family information, occupation, hobbies, etc. As is described in greater detail below, in various embodiments, user information can be used by the user matching module 206 as user matching criteria to match users for a topic-based messaging session.

When a user indicates an interest in participating in a topic-based messaging session pertaining to a particular topic, the user matching module 206 can query a user database to identify one or more potential matches for the user based on user matching criteria. For example, the one or more potential matches can include a set of users that have indicated an interest in participating in a messaging session pertaining to the same particular topic, and have at least one differing viewpoint from the user. In another example, the one or more potential matches can include a set of users that have indicated an interest in participating in a messaging session pertaining to the same particular topic, and have a differing viewpoint from the user with respect to the particular topic.

The user matching criteria can also include user ranking criteria for ranking potential matches. The user matching module 206 can rank the one or more potential matches based on the user ranking criteria. For example, potential matches can be ranked based on user ratings. In another example, potential matches can be ranked based on similarities or commonalities with a user. Although users may have differing viewpoints with respect to certain issues, users may be similar in other ways. Furthermore, users that are similar to one another may be more willing to engage in a meaningful or cordial discussion about issues on which they differ. As such, an ideal dialogue partner for a first user may be a user that has a differing viewpoint from the first user with respect to a particular topic, but is similar to the first user in many other ways.

In certain embodiments, the user matching module 206 can automatically identify a match for the user based on the user matching criteria. For example, the user matching module 206 can identify a set of potential matches, rank the set of potential matches based on the user ranking criteria, and select the top potential match based on the ranking. In other embodiments, the user may be presented with a plurality of potential matches based on the ranking, e.g., the top 3 or top 5 potential matches based on the ranking, so that the user can select one of the potential matches. Once a match has been identified for a user, a messaging session can be initiated between the user and the match.

The messaging session module 208 can be configured to generate and manage a topic-based messaging session between two or more users. Once two users have been matched with one another for a topic-based messaging session, the messaging session module 208 can generate a topic-based messaging session that includes the two users.

In certain embodiments, the messaging session module 208 can automatically generate one or more introductory messages to be presented in the topic-based messaging session. For example, the one or more introductory messages may include user information associated with each of the two users to introduce the two users to one another. In certain embodiments, the messaging session module 208 can identify commonalities between the two users and include at least one commonality in the one or more introductory messages. As discussed above, users having differing viewpoints may be more willing to engage in civil conversations about those differing viewpoints if they know that the other user is similar to them in some way. As such, the messaging session module 208 can identify one or more commonalities between the two users and generate introductory messages based on those commonalities. For example, if both users are fathers of young children, or both users have the same occupation, or both users are fans of a page associated with a particular sports team, the messaging session module 208 can be configured to automatically include this information in the introductory messages. Commonalities may be identified based on user information collected via the questionnaire, or any other user information that is available, such as user information available to a social networking system. For example, the messaging session module 208 may indicate in an introductory message that the two users in a topic-based messaging session have one or more friends in common on the social networking system.

In certain embodiments, the messaging session module 208 can also be configured to automatically terminate a topic-based messaging session if it has been idle for longer than a threshold amount of time. In some embodiments, the messaging session module 208 can automatically terminate a topic-based messaging session if a threshold event has been detected to have occurred. For example, the threshold event can be an indication by a user participating in the session that the session has ended (e.g., "I enjoyed chatting with you."). In certain embodiments, the messaging session module 208 can automatically delete the contents of a topic-based messaging session. For example, a topic-based messaging session's contents may be deleted as soon as the messaging session has been terminated, or after a threshold period of time after the messaging session has been terminated. In certain embodiments, the topic-based messaging session may be closed off to other participants such that only the users selected for the topic-based messaging session can participate, and no other users can be added. For example, if two users have been selected to participate in a topic-based messaging session, then only those two users can participate, or if three users have been selected, then only those three users can participate. In certain embodiments, an "add users" feature that may normally be available in a social networking system messaging system may be disabled for topic-based messaging sessions.

Figure 3A:
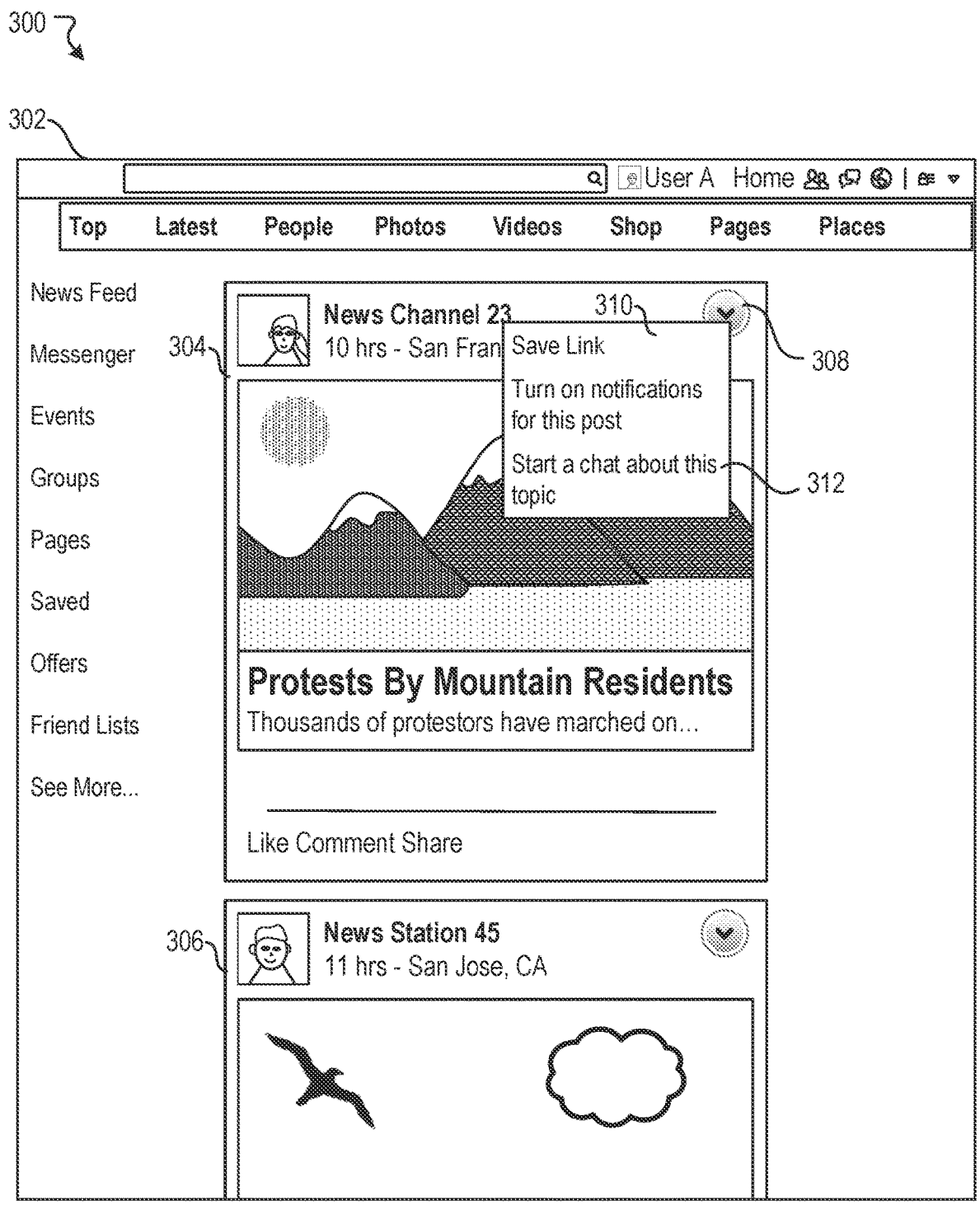
FIG. 3A illustrates an example scenario associated with receiving a request for a topic-based messaging session, according to an embodiment of the present disclosure.

FIG. 3A illustrates an example scenario 300 associated with receiving a request for a topic-based messaging session, according to an embodiment of the present disclosure. The example scenario 300 includes a user interface 302 comprising a social networking system feed. The user interface 302 displays two content posts 304, 306. The first content post 304 is a content post about "Protests By Mountain Residents." A user viewing the user interface 302 has selected a chevron dropdown menu icon 308 to reveal a dropdown menu 310. The dropdown menu 310 includes a selection 312 to "Start a chat about this topic." The user can select the selection 312 to request a topic-based messaging session pertaining to a topic associated with the content post 304, e.g., "protests by mountain residents."

FIG. 3B illustrates an example scenario 350 associated with requesting and/or providing user information for a topic-based messaging session, according to an embodiment of the present disclosure. The example scenario 350 includes an example questionnaire 352. The questionnaire 352 can be presented to a user, for example, in response to a user requesting a topic-based messaging session (e.g., by selecting the selection 312 of FIG. 3A). A first portion 354 of the questionnaire 352 asks for user viewpoint information. Specifically, it asks a user to describe his or her views, on a scale from "very conservative" to "very liberal," in various categories, e.g., social, fiscal, political, and religion. A second portion 356 of the questionnaire 352 requests additional user information. In the example questionnaire 352, the additional user information includes Location, Age, Marital Status, Education, Number of Children, Occupation, and Hobbies. A third portion 358 of the questionnaire 352 asks a user to write a brief statement introducing himself or herself. Many variations are possible.

FIG. 3C illustrates an example scenario 370 associated with generating and/or managing a topic-based messaging session, according to an embodiment of the present disclosure. The example scenario 370 includes a messaging session interface 372. The messaging session interface 372 includes a message display window 374 and a message input window 376. The message display window 374 displays messages that have been submitted to the messaging session. The message input window 376 allows a user to input a new message for submission to the messaging session. In the example scenario 370, the message display window 374 includes two automatically generated introductory messages 378, 380. A first introductory message 378 introduces Mike, a first user participating in the topic-based messaging session. A second introductory message 380 introduces Joe, a second user participating in the topic-based messaging session. The introductory messages 378, 380 have been automatically generated based on user information associated with the two users. The user information may have been provided by the two users via a questionnaire, such as the questionnaire 352 of FIG. 3B. In certain embodiments, content for the introductory messages 378, 380 may be automatically selected so as to highlight one or more commonalities between the users participating in a topic-based messaging session.

FIG. 4 illustrates an example scenario 400 associated with requesting and/or providing user ratings based on a topic-based messaging session, according to an embodiment of the present disclosure. The example scenario 400 includes a user review survey 402 which asks a first user that has participated in a topic-based messaging session to rate and/or review a second user that also participated in the topic-based messaging session. The user review survey 402 asks the first user to provide a numerical rating (or score) of the second user in the categories of friendliness, factualness, and respectfulness. The user review survey 402 also asks the first user to provide any additional comments that he or she may have about the topic-based messaging session with the second user.

As a user participates in one or more topic-based messaging sessions, other users can provide reviews and/or ratings of the user. These ratings can be used to determine various categorical ratings associated with the user, as well as an overall user rating associated with the user. For example, if a first user has participated in three topic-based messaging sessions, and has received "friendliness" ratings of 5, 5, and 3, then the user's friendliness rating may be, for example, an average of those ratings, i.e., 4.3. Similarly, if the first user has received "factualness" ratings of 4, 3, and 2, then the first user's overall factualness rating may be 3.0. If the first user has received "respectfulness" ratings of 5, 5, and 4, then the first user's respectfulness rating may be 4.7. In certain embodiments, an overall user rating can be calculated for the user based on these categorical ratings. In the above example, the first user has a friendliness rating of 4.3, a factualness rating of 3, and a respectfulness rating of 4.7. The first user's overall user rating may be, for example, an average of these categorical ratings, i.e., 4.0. In various embodiments, as described above, ratings associated with a user, e.g., categorical ratings and/or overall user ratings, may be used in ranking potential matches for a topic-based messaging session.

Figure 5:
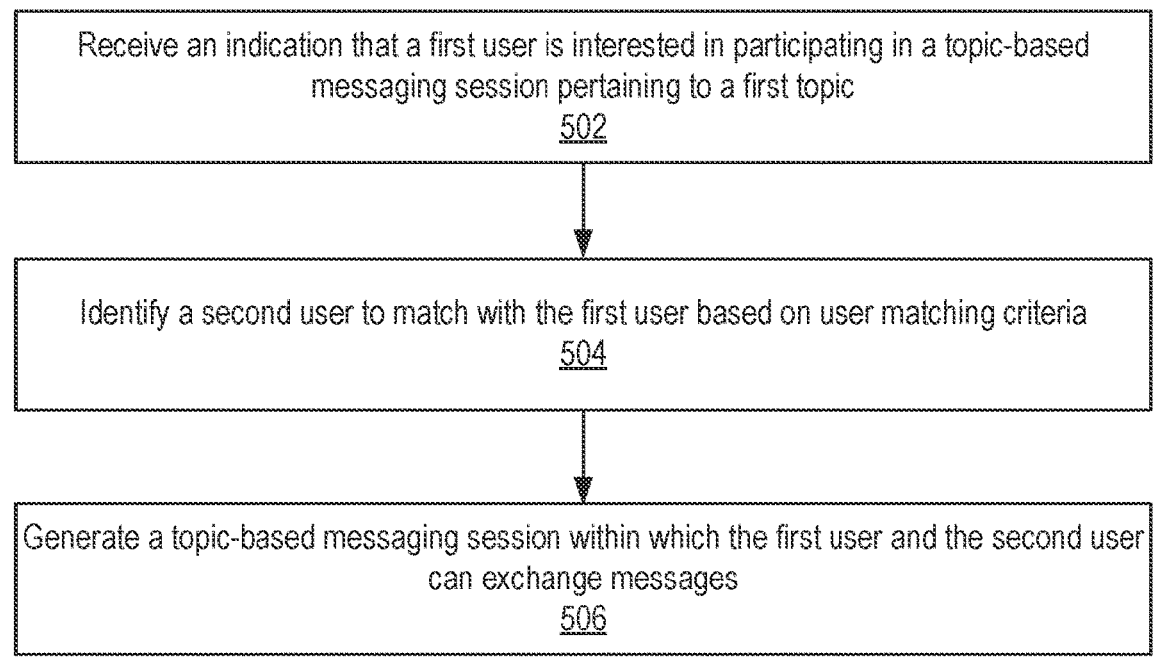
FIG. 5 illustrates an example method associated with facilitating a topic-based messaging session, according to an embodiment of the present disclosure.

FIG. 5 illustrates an example method 500 associated with facilitating a topic-based messaging session, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive an indication that a first user is interested in participating in a topic-based messaging session pertaining to a first topic. At block 504, the example method 500 can identify a second user to match with the first user based on user matching criteria. At block 506, the example method 500 can generate a topic-based messaging session within which the first user and the second user can exchange messages.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
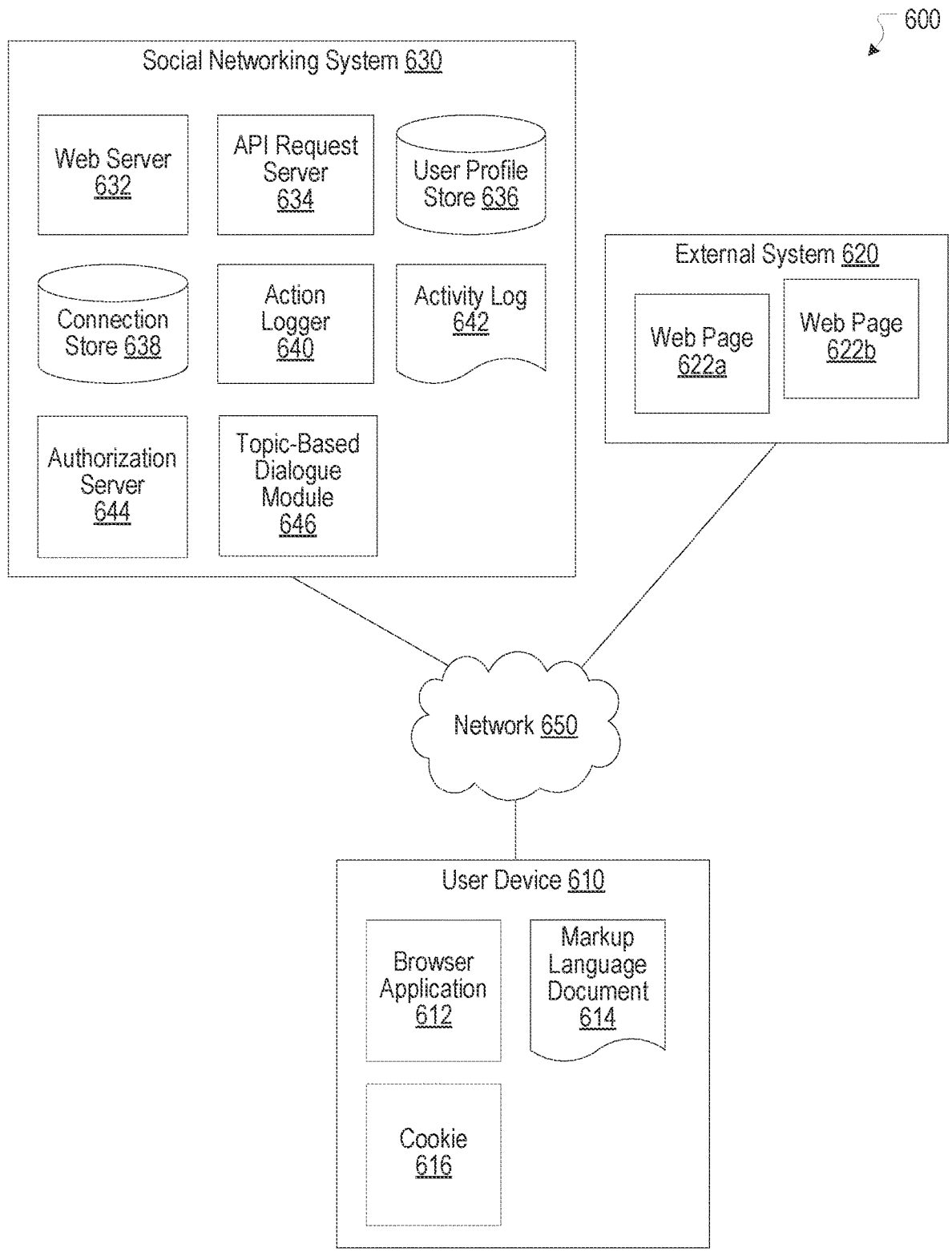
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a topic-based dialogue module 646. The topic-based dialogue module 646 can, for example, be implemented as the topic-based dialogue module 102, as discussed in more detail herein. As discussed previously, it should be appreciated that there can be many variations or other possibilities. For example, in some embodiments, one or more functionalities of the topic-based dialogue module 646 can be implemented in the user device 610.

Hardware Implementation

Figure 7:
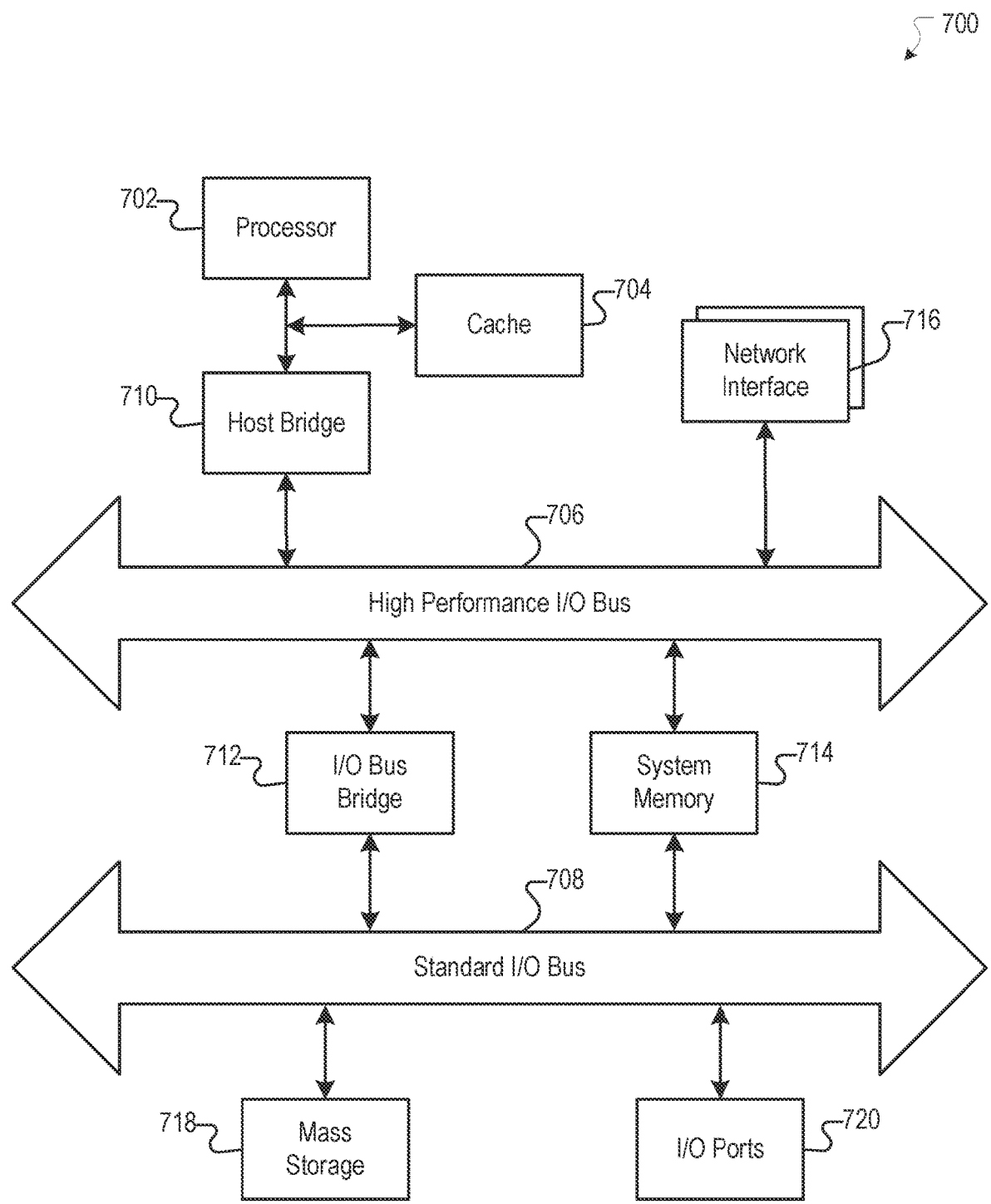
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing system, a content post to a first user, wherein the content post is associated with an option selectable by the first user to indicate that the first user has a first viewpoint;
   providing, by the computing system, the content post to a second user, wherein the content post is associated with an option selectable by the second user to indicate that the second user has a second viewpoint different from the first viewpoint;
   identifying, by the computing system, the second user based on the second viewpoint and at least one commonality shared between the first user and the second user; and
   generating, by the computing system, a messaging session in which the first user and the second user can exchange messages.

2. The computer-implemented method of claim 1, wherein the first viewpoint and the second viewpoint are associated with at least one of politics, fiscal policies, social policies, or religion.

3. The computer-implemented method of claim 1, further comprising:
   providing, by the computing system, a user review survey to the first user that asks the first user to rate the second user; and
   receiving, by the computing system, user rating information from the first user for the second user based at least in part on the user review survey.

4. The computer-implemented method of claim 3, wherein the user rating information is associated with at least one user matching criterion of friendliness, respectfulness, factualness, or a degree of knowledge on a topic associated with the content post.

5. The computer-implemented method of claim 3, wherein the identifying the second user based on the second viewpoint and at least one commonality shared between the first user and the second user further comprises:
   comparing user rating information associated with the second user and user rating information associated with a third user; and
   upranking the second user over the third user based on a comparison of the user rating information associated with the second user and the user rating information associated with the third user.

6. The computer-implemented method of claim 1, wherein the at least one commonality shared between the first user and the second user is associated with at least one of a location, age, marital status, education, number of children, hobbies, interests, or pages followed.

7. The computer-implemented method of claim 1, further comprising:
   receiving, by the computing system, a request for the messaging session from the first user; and
   in response to the receiving the request, providing, by the computing system, the first user a questionnaire that asks for user viewpoint information.

8. The computer-implemented method of claim 1, further comprising:
   performing, by the computing system, natural language analysis of messages exchanged within the messaging session;
   determining, by the computing system, that a message indicative of termination of the message session is sent from the first user to the second user; and
   terminating, by the computing system, the messaging session based on the message.

9. The computer-implemented method of claim 1, further comprising:
   generating, by the computing system, an introductory message of the second user based on the first view point and the second viewpoint; and
   providing, by the computing system, the introductory message to the first user in the messaging session.

10. The computer-implemented method of claim 1, further comprising:
    generating, by the computing system, an introductory message of the second user based on the at least one commonality; and
    providing, by the computing system, the introductory message to the first user in the messaging session.

11. A system comprising:
at least one processor; and
a memory storing instructions that, when executed by the at least one processor, cause the system to perform:
providing a content post to a first user, wherein the content post is associated with an option selectable by the first user to indicate that the first user has a first viewpoint;
providing the content post to a second user, wherein the content post is associated with an option selectable by the second user to indicate that the second user has a second viewpoint different from the first viewpoint;
identifying the second user based on the second viewpoint and at least one commonality shared between the first user and the second user; and
generating a messaging session in which the first user and the second user can exchange messages.

12. The system of claim 11, wherein the first viewpoint and the second viewpoint are associated with at least one of politics, fiscal policies, social policies, or religion.

13. The system of claim 11, further comprising:
providing a user review survey to the first user that asks the first user to rate the second user; and
receiving user rating information from the first user for the second user based at least in part on the user review survey.

14. The system of claim 13, wherein the user rating information is associated with at least one user matching criterion of friendliness, respectfulness, factualness, or a degree of knowledge on a topic associated with the content post.

15. The system of claim 13, wherein the identifying the second user based on the second viewpoint and at least one commonality shared between the first user and the second user further comprises:
comparing user rating information associated with the second user and user rating information associated with a third user; and
upranking the second user over the third user based on a comparison of the user rating information associated with the second user and the user rating information associated with the third user.

16. A non-transitory computer-readable storage medium including instructions that, when executed by at least one processor of a computing system, cause the computing system to perform a method comprising:
providing a content post to a first user, wherein the content post is associated with an option selectable by the first user to indicate that the first user has a first viewpoint;
providing the content post to a second user, wherein the content post is associated with an option selectable by the second user to indicate that the second user has a second viewpoint different from the first viewpoint;
identifying the second user based on the second viewpoint and at least one commonality shared between the first user and the second user; and
generating a messaging session in which the first user and the second user can exchange messages.

17. The non-transitory computer-readable storage medium of claim 16, wherein the first viewpoint and the second viewpoint are associated with at least one of politics, fiscal policies, social policies, or religion.

18. The non-transitory computer-readable storage medium of claim 16, further comprising:
providing a user review survey to the first user that asks the first user to rate the second user; and
receiving user rating information from the first user for the second user based at least in part on the user review survey.

19. The non-transitory computer-readable storage medium of claim 18, wherein the user rating information is associated with at least one user matching criterion of friendliness, respectfulness, factualness, or a degree of knowledge on a topic associated with the content post.

20. The non-transitory computer-readable storage medium of claim 18, wherein the identifying the second user based on the second viewpoint and at least one commonality shared between the first user and the second user further comprises:
comparing user rating information associated with the second user and user rating information associated with a third user; and
upranking the second user over the third user based on a comparison of the user rating information associated with the second user and the user rating information associated with the third user.

* * * * *